US008219810B2

(12) United States Patent
Jakobsson (10) Patent No.: US 8,219,810 B2
(45) Date of Patent: Jul. 10, 2012

(54) METHOD AND SYSTEM FOR FACILITATING THROTTLING OF INTERPOLATION-BASED AUTHENTICATION

(75) Inventor: Bjorn Markus Jakobsson, Mountain View, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 439 days.

(21) Appl. No.: 12/618,385

(22) Filed: Nov. 13, 2009

(65) Prior Publication Data
US 2011/0119488 A1 May 19, 2011

(51) Int. Cl.
*H04L 9/32* (2006.01)
*H04K 1/00* (2006.01)
(52) U.S. Cl. .......................................... 713/168; 380/30
(58) Field of Classification Search .................. 713/168; 380/30
See application file for complete search history.

(56) References Cited

U.S. PATENT DOCUMENTS 7,634,087 B2 * 12/2009 Boneh et al. .................... 380/28
7,796,784 B2 * 9/2010 Kondo et al. .................. 382/117

OTHER PUBLICATIONS

Dalu Zhang; Min Liu; Zhe Yang; "Zero-knowledge proofs of identity based on ELGAMAL on conic," E-Commerce Technology for Dynamic E-Business, 2004. IEEE International Conference on, vol., No., pp. 216-223, Sep. 15-15, 2004 doi: 10.1109/CEC-EAST.2004.77 URL: http://ieeexplore.ieee.org/stamp/stamp.jsp?tp=&arnumber=1388326&isnumber=30211.*

Chakrabarti, S.; Chandrasekhar, S.; Calvert, K.L.; Singhal, M.; "Efficient Blind Signatures for Accountability," Secure Network Protocols, 2007. NPSec 2007. 3rd IEEE Workshop on , vol., No., pp. 1-6, Oct. 16-16, 2007; doi:10.1109/NPSEC.2007.4371624 URL: http://ieeexplore.ieee.org/stamp/stamp.jsp?tp=&arnumber=4371624&isnumber=4371610.*

\* cited by examiner

*Primary Examiner* — Philip Chea
*Assistant Examiner* — Feliciano Mejia
(74) *Attorney, Agent, or Firm* — Shun Yao; Park, Vaughan, Fleming & Dowler LLP (57) ABSTRACT

One embodiment provides a system that facilitates throttling of interpolation-based authentication at a client. During operation, the system receives data points encrypted with a public key associated with a throttle server. The system then applies offsets to the data points, wherein a respective offset for a data point is associated with a user input. The system blinds the offset data points, and sends to the throttle server the blinded offset data points, thereby allowing the throttle server to perform an interpolation on the blinded offset data points and maintain a count of interpolation attempts from the client. Subsequently, the system receives from the throttle server an evaluation point based at least on the interpolation. In response, the system unblinds the evaluation point, and uses the unblinded evaluation point as a secret for a subsequent authentication process.

20 Claims, 6 Drawing Sheets

METHOD AND SYSTEM FOR FACILITATING THROTTLING OF INTERPOLATION-BASED AUTHENTICATION

BACKGROUND

1. Field

The present disclosure relates generally to authentication. More specifically, the present disclosure relates to a method and system for facilitating throttling of interpolation-based authentication.

2. Related Art

In traditional cryptography, a frequently used primitive is Lagrange interpolation. Lagrange interpolation involves determining a least-degree polynomial that can interpolate a number of given data points. Lagrange interpolation has many uses in threshold cryptography, such as distributed generation of digital signatures, distributed recovery of secret keys (e.g., where the key has been lost or the key owner has been disabled), and access to a resource by one or more parties with required access information.

Using Lagrange interpolation, a threshold number of correctly selected values can be used to interpolate a polynomial and compute an intended output based on the Lagrange interpolation of the correctly selected values (e.g., the output of the Lagrange polynomial with a given evaluation input). This intended output can represent a secret that can be used for a subsequent authentication purpose, such as password recovery or generation of a digital signature. The idea behind using Lagrange interpolation for authentication is that fewer than a threshold number of such correct values would not carry any meaningful information about the intended output with the evaluation input. Furthermore, the user is not required to provide correct answers too all the challenge questions, so long as a sufficient number of correct answers can be provided to generate the correct interpolation.

The security guarantees of Lagrange interpolation do not exceed the entropy of the underlying shared secrets (i.e., the values needed to derive the polynomial and to compute the intended output). For example, when the polynomial is of a low degree, an adversary can exhaustively search the space of all possible assignments of values, perform interpolation for each such assignment, and then determine when a correct output has been obtained. It is also possible that the attacker can derive the correct answers to the challenge questions by using the trial-and-error method.

The above-described security limitation is particularly severe when the order of the Lagrange polynomial is low (i.e., the number of challenge questions is insufficient). The number of possible answers for a respective question may be relatively small, and the number of questions a typical user would be willing to answer can be relatively small. Thus, the total entropy will be low in these situations. In such situations, exhaustive-search-based or lattice-analysis-based attacks can present a higher risk to the security and privacy of the system.

SUMMARY

One embodiment provides a system that facilitates throttling of interpolation-based authentication at a client. During operation, the system receives data points encrypted with a public key associated with a throttle server. The system then applies offsets to the data points, wherein a respective offset for a data point is associated with a user input. The system blinds the offset data points, and sends to the throttle server the blinded offset data points, thereby allowing the throttle server to perform an interpolation on the blinded offset data points and maintain a count of interpolation attempts from the client. Subsequently, the system receives from the throttle server an evaluation point based at least on the interpolation. In response, the system unblinds the evaluation point, and uses the unblinded evaluation point as a secret for a subsequent authentication process.

In a variation on this embodiment, the received data points are encrypted based on an ElGamal encryption scheme using the throttle server's public key. Furthermore, while blinding the offset data points, the system raises each element of the corresponding ElGamal ciphertext to the exponent of a randomly selected value, r.

In a further variation, while unblinding the evaluation point, the system raises the evaluation point to the exponent of $1/r$.

In a variation on this embodiment, the system presents a number of challenge questions to a user, wherein a respective question corresponds to a respective data point.

In a further embodiment, the system receives answers from the user to the challenge questions. The system further determines a respective offset for a data point based on the user's answer to the challenge question corresponding to the data point.

One embodiment of the present invention provides a system that facilitates throttling of interpolation-based authentication at a throttle server. During operation, the system receives from a client an interpolation request, wherein the interpolation request indicates a number of data points. The system then performs an interpolation based at least on the blinded offset data points. The system then computes an evaluation point based on the interpolation. In addition, the system maintains a count of the number of interpolation requests from the client, and sends the evaluation point to the client.

In a variation on this embodiment, the system decrypts the received data points based on a private key associated with the throttle server prior to performing the interpolation or decrypts the evaluation point subsequent to computing the evaluation point, wherein sending the evaluation point to the client comprises sending the decrypted evaluation point to the client.

In a further variation, while decrypting the data points or the evaluation point, the system applies an ElGamal decryption scheme using a private key associated with the throttle server.

In a variation on this embodiment, the system determines whether the number of interpolation requests from the client exceeds a predetermined value.

In a variation on this embodiment, the received data points are previously encrypted based at least on a public key associated with the throttle server, and are previously offset and blinded by the client.

BRIEF DESCRIPTION OF THE FIGURES

In the figures, like reference numerals refer to the same figure elements.

DETAILED DESCRIPTION

Overview

In embodiments of the present invention, the problem of preventing an interpolation-based authentication attack is solved by a throttle server that controls interpolation attempts and a client that preserves the privacy of challenge questions. Often, a user is asked a series of questions in order to receive authentication. However, when the number of questions is low, an attacker can use exhaustive search or lattice analysis to obtain authentication. Embodiments of the present invention can prevent such attacks by throttling (controlling) the number of requests at a throttle server. Embodiments of the present invention can also preserve the user's privacy for both the questions asked and their answers, hence preventing the throttle server from learning the questions and their answers from the user.

In embodiments of the present invention, each question corresponds to a data point (e.g., a point with an (x, y) coordinate) which has been previously encrypted with a public key of a throttle server. Each possible answer to a given question corresponds to an offset (e.g., a Δx, Δy, or both) that can be applied to the associated data point. Since a question has multiple answer choices, there can be multiple offsets to the data point corresponding to the question. However, only the correct answer yields the desired offset, which "nudges" the original given data point to a desired position. This offset data point, together with other desired offset data points, can then used as the desired input for Lagrange interpolation. Note that in this disclosure, although the examples are described in the context of a two-dimensional space, embodiments of the present invention can be implemented in a space of an arbitrary degree of dimensions.

To protect the privacy of the questions and user answers, the client performs one additional operation to the offset data points before sending them to the throttle server for Lagrange interpolation. In one embodiment, the client "blinds" such offset points. The term "blinding" here refers to the process of adding one level of obscurity to the offset data point, so that the throttle server cannot learn the actual value of the data points sent by the client. However, the server can still perform the interpolation and return the value of an evaluation point based on the interpolation. This evaluation point can then be "unblinded" by the client using a reverse process corresponding to the blinding process. As described later, in one embodiment, the data points are first encrypted using the ElGamal encryption scheme before the clients applies offsets to them. The client then raises the elements in the resulting cipher text to a random exponent, as part of the blinding process. The client can later unblind the returned evaluation point by raising the evaluation point to the exponent whose value is the reciprocal of the previously selected random value. This blinding/unblinding process is "transparent" to the Lagrange interpolation. In other words, the blinding/unblinding of the offset data points is commutative to the throttle server's decryption and interpolation, and does not affect the correctness of the interpolation.

The blinding of the offset data points prevents the throttle server from learning both the questions and user answers. Meanwhile, the client relies on the throttle server to perform the correct interpolation because the data points are encrypted with the throttle server's public key. This configuration allows the throttle server to keep track of the number of authentication requests from the client (since the client relies on the throttle server to perform the interpolation). Furthermore, the throttle server is prevented from learning the questions and answers.

After receiving the blinded offset data points, the throttle server can determine a point on the curve corresponding to the Lagrange polynomial, decrypt it with the throttle server's private key, and send the decrypted value to the client. In one embodiment, this point is the constant for the Lagrange polynomial (i.e., the point at which the curve intersects with the y-axis), but it can be any point on the interpolation curve for a previously agreed-upon input value. Client then receives and unblinds the decrypted evaluation point. This unblinded value corresponds to a secret, which can then be used for a subsequent authentication-related function.

The throttle server can reduce the risk of authentication attack by limiting the number of interpolation requests by the client. In one embodiment, the throttle server maintains a counter that tracks the number of interpolation requests. The throttle server can determine whether the number of requests exceeds a predetermined value and rejects the requests accordingly.

Figure 1:
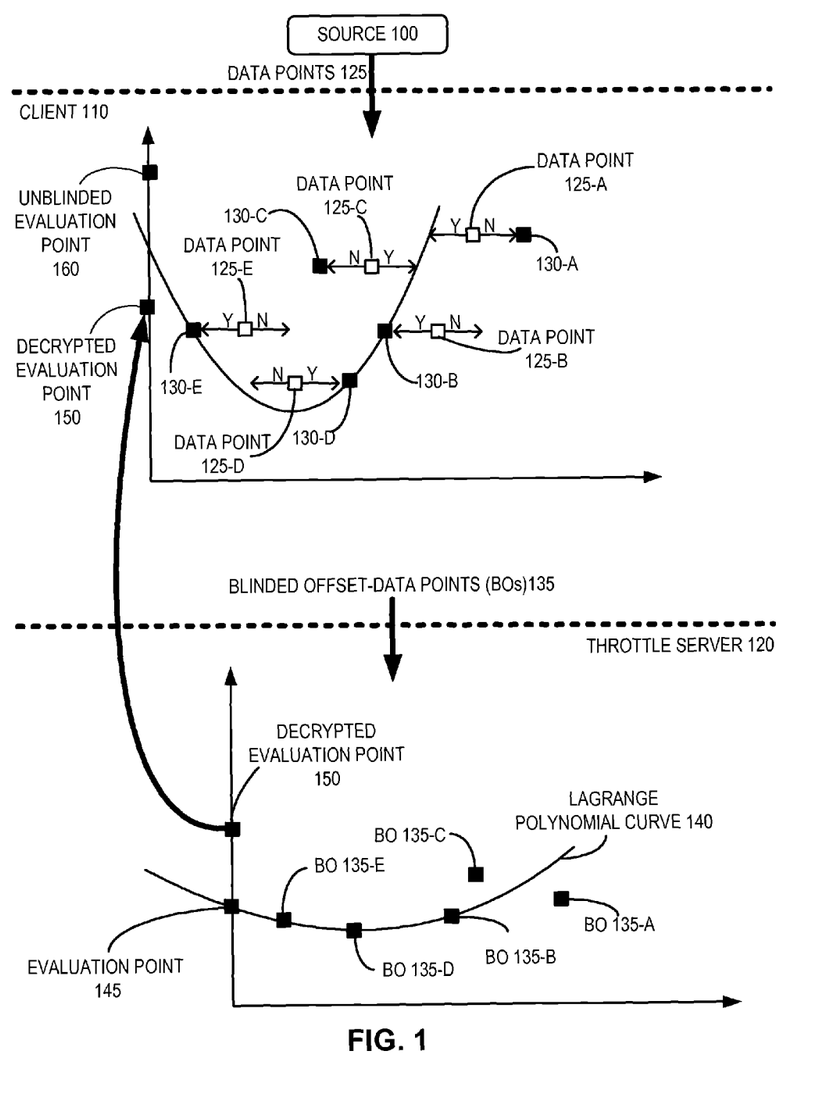
FIG. 1 illustrates an exemplary client-server application in accordance with an embodiment.

FIG. 1 illustrates an exemplary client-server application in accordance with an embodiment. The system includes a client 110 and a throttle server 120. Client 110 receives data points 125 from a source 100, where the data points encrypted with throttle server 120's public key. Note that the public/private key pair associated with throttle server 120 can be unique to client 110. Furthermore, throttle server 120 may or may not the same entity as source 100. That is, a third party can encrypt the data points using throttle server 120's public key.

After client 110 receives data points 125, client 110 can ask the user a series of questions, each of which being associated with multiple possible answers and corresponding to a data point. A correct response (denoted by a "Y") offsets the data point to a desired point on the polynomial, whereas an incorrect response (denoted by an "N") offsets the data point to an incorrect point, off the polynomial. For example, the client offsets data point 125-A to point 130-A when it receives an incorrect response to a question associated with data point 125-A. Similarly, the client offsets data point 125-B to point 130-B upon receiving a correct answer, data point 125-C to point 130-C upon receiving an incorrect answer, data point 125-D to point 130-D upon receiving a correct answer, and data point 125-E to point 130-E upon receiving a correct answer. The figure shows three correct answers and two incorrect answers. The offsets can be binary (i.e., yes or no) or vectors (i.e., multi-directional).

Note that it is possible for client 110 to determine the point at which the curve passes through the y-axis by performing Lagrange interpolation without the throttle server. However, determining this point will not help the client determine the key for the password because data points 125-A to 125-E, on which the offsets are based, are encrypted with the throttle server's public key. That is, client 110 relies on throttle server 120 to decrypt the results using throttle server 120's private key.

Next, the client blinds the offset data points to produce blinded offset data points 135 (BOs 135). The client then sends BOs 135 to throttle server 120. Throttle server 120 determines a Lagrange polynomial curve 140 based on BOs 135. Note that throttle server 120 determines a best-fitting Lagrange polynomial by determining that BO 135-B, BO 135-D, and BO 135-E are part of the Lagrange polynomial while BO 135-A and BO 135-C are not. In general, throttle server 120 can use a majority vote to determine which points to use for the interpolation. Once throttle server 120 determines Lagrange polynomial curve 140, throttle server 120 determines an evaluation point 145 on the curve, which in this example is the intersection point with the y-axis (i.e., the constant term of the Lagrange polynomial).

Next, throttle server 120 decrypts the evaluation point using throttle server 120's private key. This operation results in decrypted evaluation point 150. Recall that data points 125-A to 125-B are encrypted with throttle server 120's public key, which is why throttle server 120 decrypts evaluation point 145 with its private key. Furthermore, because the encryption/decryption is commutative with respect to the interpolation, throttle server 120 can optionally decrypt the received data points prior to performing the interpolation, instead of decrypting the evaluation point after the interpolation.

Next, throttle server 120 sends the value of the decrypted evaluation point 150 to client 110. Client 110 then unblinds evaluation point 150 and obtains unblinded evaluation point 160. Recall that BOs 135 are blinded by the client, which is why client 110 unblinds the decrypted evaluation point 150 to obtain unblinded evaluation point 160. Note that the blinding/unblinding process is also commutative with respect to the throttle server 120's decryption and interpolation processes.

Subsequently, client 110 can use unblended evaluation point 160 for an authentication process. For example, client 110 can provide the unblended evaluation point 160 to an authentication process and compare it with a previously stored authentication credential. This authentication credential can be a numeric value that matches unblended evaluation point 160. Furthermore, the authentication process can occur at an authentication server that is different from client 110 and throttle server 120. In other embodiments, client 110 can use unblended evaluation point 160 to generate a digital signature.

In the example described above, client 110 relies on throttle server 120 for providing the decrypted evaluation point 145, because data points 125-A to 125-E are encrypted with throttle server 120's public key. However, throttle server 120 cannot learn the answers or questions, because client 110 blinds the offset data points 130-A to 130-E. Throttle server 120 can control the number of authentication attempts to prevent authentication attacks via exhaustive search or lattice analysis from client 110.

System Operation

Figure 2:
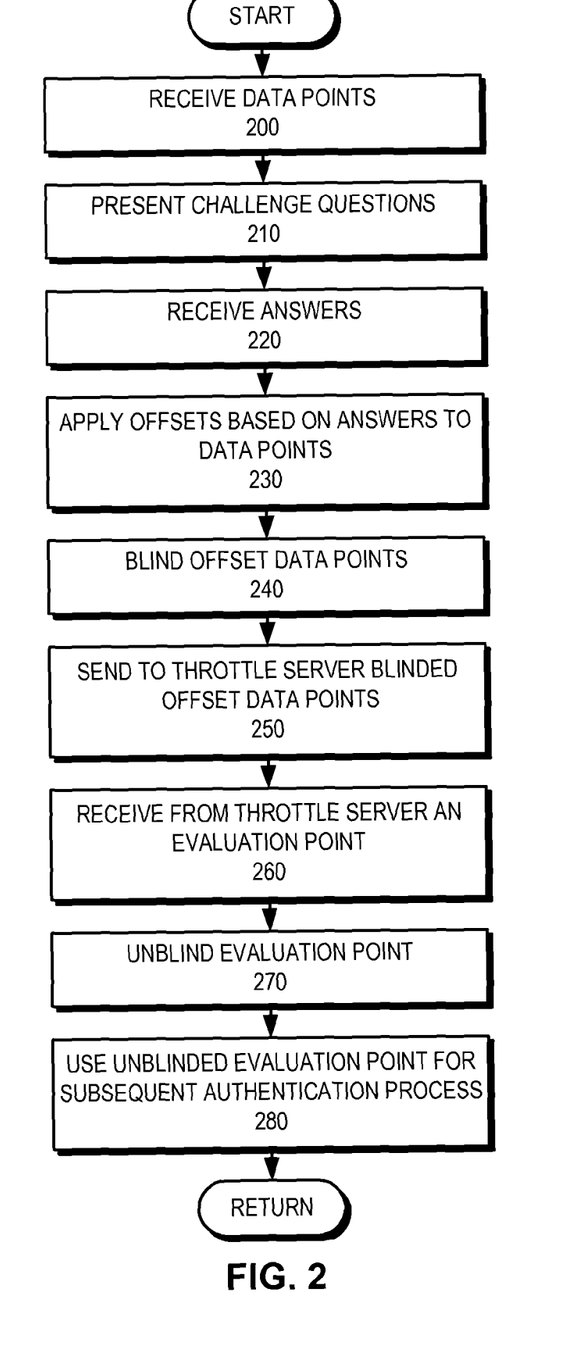
FIG. 2 presents a flow chart illustrating the process of facilitating throttling of interpolation-based authentication at a client in accordance with an embodiment.

FIG. 2 presents a flow chart illustrating the process of facilitating throttling of interpolation-based authentication at a client in accordance with an embodiment. During operation, the client receives a set of data points (operation 200). The data points are encrypted with a throttle server's public key, as part of a public-private key pair that is specific to the client. Each data point is associated with a challenge question. Next, the system presents a number of challenge questions to the user (operation 210). These questions can have multiple answers, which the client receives (operation 220). The client then applies offsets to the data points based on the answers (operation 230). Note that client does not necessarily have the knowledge of what the correct answer is to each question; it simply applies the offsets to the data points. Subsequently, the client blinds the offset data points (operation 240) and sends the blinded offset data points to the throttle server (operation 250). In response, the client receives from the throttle server an evaluation point (operation 260). Note that, on the throttle server side, the throttle server performs the interpolation on the blinded offset data points, and subsequently decrypts the evaluation point using its private key. The client then unblinds the received evaluation point using process that is the reverse of the blinding process (operation 270). Subsequently, the client uses the unblinded evaluation point as a secret for a subsequent authentication process.

Figure 3:
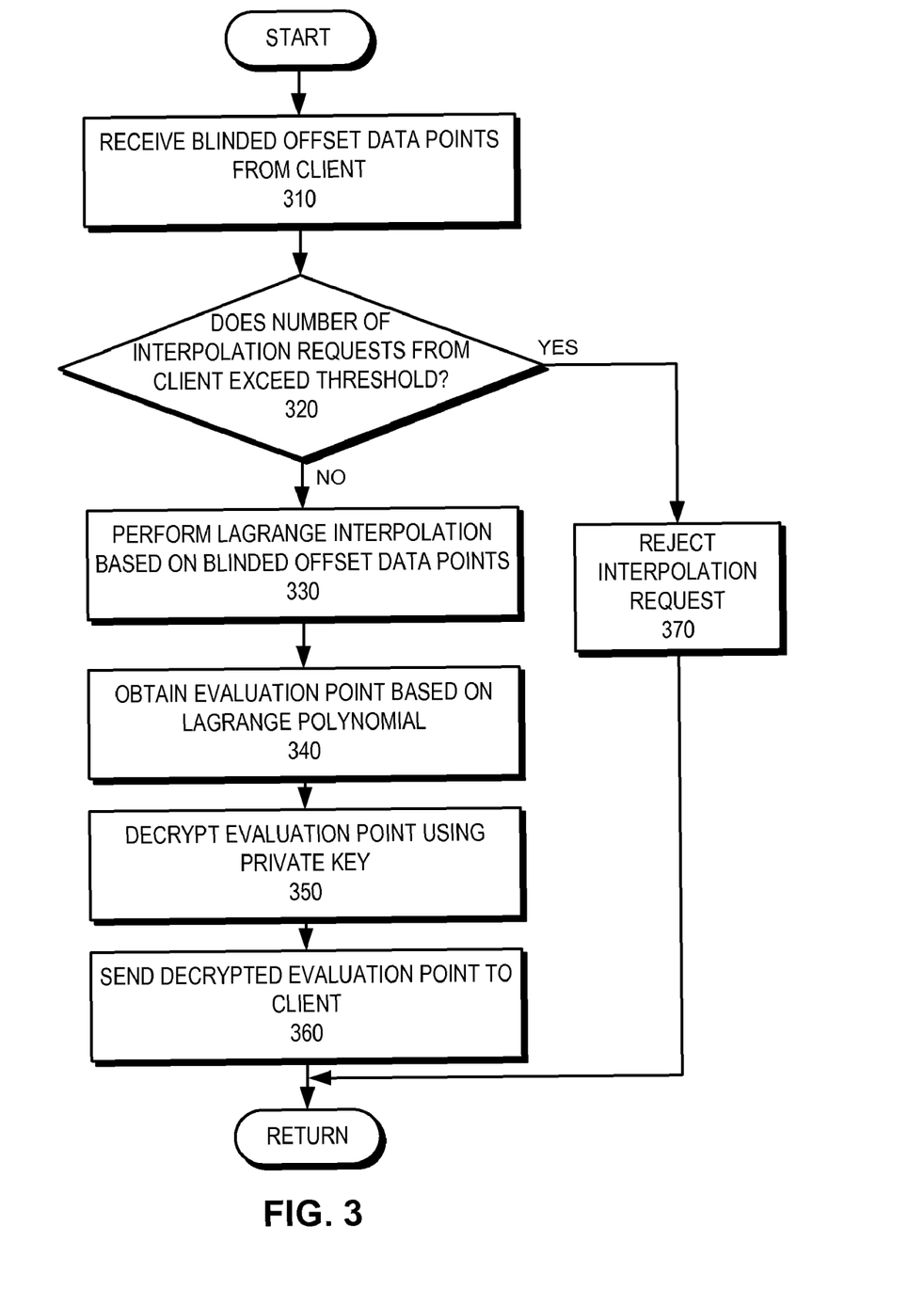
FIG. 3 presents a flow chart illustrating the process of facilitating throttling of interpolation-based authentication at a throttle server in accordance with an embodiment.

FIG. 3 presents a flow chart illustrating the process of facilitating throttling of interpolation-based authentication at a throttle server in accordance with an embodiment. During operation, the throttle server receives from a client blinded offset data points (operation 310). Next, the throttle server determines whether the number of interpolation requests from the same client has exceeded a threshold (operation 320). If so, the throttle server rejects the interpolation request (operation 370). Otherwise, the throttle server performs Lagrange interpolation based on the blinded offset data points (operation 330).

The throttle server then obtains the evaluation point based on the Lagrange polynomial (operation 340). Next, the throttle server decrypts the evaluation point using its private key (operation 350). This decrypted evaluation point is subsequently sent to the client (operation 360).

Figure 4A:
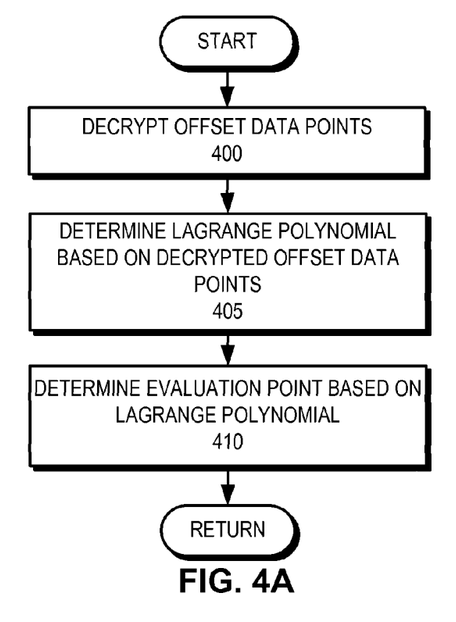
FIGS. 4A and 4B present flow charts illustrating the process of producing a decrypted interpolation point at a throttle server in accordance with an embodiment.
Figure 4B:
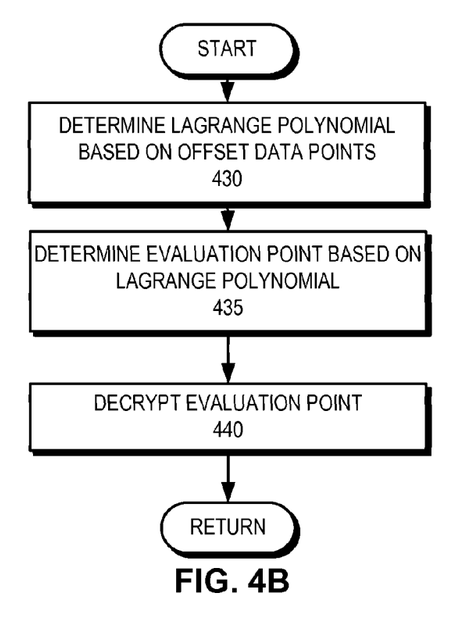

Since the encryption and decryption of the data points based on the throttle server's public and private keys are commutative with respect to the interpolation, the throttle server can either decrypt the blinded offset data points prior to interpolation, or decrypt the evaluation point after the interpolation. FIG. 4A presents a flow chart illustrating the process of providing an evaluation point at a throttle server by decrypting the received offset data points, in accordance with an embodiment. During operation, the throttle server decrypts the received offset data points based on the ElGamal decryption using its private key (operation 400). Next, the throttle server determines a Lagrange polynomial based on the decrypted offset data points (operation 405). Subsequently, the throttle server determines the evaluation point based on the Lagrange polynomial (operation 410). Since the offset data points are decrypted, there is no need to decrypt the evaluation point.

FIG. 4C presents a flow chart illustrating the process of providing a decrypted evaluation point at a throttle server, in accordance with an embodiment. During operation, the throttle server determines a Lagrange polynomial based on the received offset data points (operation 430). Next, the throttle server determines an evaluation point based on the Lagrange polynomial (operation 435). Subsequently, the throttle server decrypts the evaluation point based on the ElGamal decryption method using its private key (operation 440).

ElGamal Encryption and Decryption

In embodiments of the present invention, prior to being offset, data points are encrypted using ElGamal encryption with a public key associated with the throttle server. An ElGamal encryption produces, as a result, a pair of ciphertext values (a, b). Prior to encryption with the throttle server's public key, a data point corresponds to a pair of coordinates $(x_i', y_i')$, where x' is the x-axis value, y' is the y-axis value, and i is the index of the data point. When a data point $(x_i', y_i')$ is encrypted with ElGamal encryption, in one embodiment, only $y_i'$ is encrypted. The encrypted data point is denoted as $(x_i', Y_i')$. Note that $Y_i'$ is in the form of a pair of ciphertext values, as a result of the ElGamal encryption. Next, the client applies an offset to $Y_i'$ based on the user answer to obtain the offset data point $(x_i, Y_i)$. In one embodiment, the offset for data point i is a multiplier that is applied to $Y_i'$. That is, $Y_i=Y_i' \cdot \text{offset}_i$. Furthermore, it is optional to perform any operation on the x-axis coordinate, $x_i=x_i'$. Note that since $Y_i'$ is in the form of a pair of ciphertext values $(a_i', b_i')$, $Y_i$ is in the form of $(a_i, b_i)$, where $a_i=a_i' \cdot \text{offset}_i$, and $b_i=b_i' \cdot \text{offset}_i$.

Next, the client blinds the offset data point $(x_i, Y_i)$ by raising both elements of the ciphertext for $Y_i$ to an exponent of a randomly selected value r. That is, the client produces a blinded offset data point $(x_i, B_i)$ where $B_i$ is in the form of a pair of ciphertext values $(a_i^r, b_i^r)$. The client then transmits the blinded offset data point $(x_i, B_i)$, together with other blinded offset data points, to the throttle server.

After receiving the blinded offset data points, the throttle server performs a Lagrange interpolation, and obtains the value of the evaluation point C where the interpolated curve intersects with the y-axis. The throttle server than performs ElGamal decryption on the evaluation point C using its private key to obtain a decrypted evaluation point value c. The throttle server than transmits c back to the client.

Subsequently, the client unblinds c by raising c to the exponent of a value that is the reciprocal of the previously randomly selected value r. That is, the client computes $z=c^{1/r}$. The unblended evaluation point, z, can then be used by the client as the secret for subsequent authentication functions.

More details of ElGamal encryption and decryption can be found in Taher ElGamal, "A Public-Key Cryptosystem and a Signature Scheme Based on Discrete Logarithms", IEEE Transactions on Information Theory, v. IT-31, n. 4, 1985, pp 469-472 or CRYPTO 84, pp 10-18, Springer-Verlag, which is incorporated by reference herein.

Apparatus for Facilitating Throttling of Interpolation-Based Authentication

Figure 5:
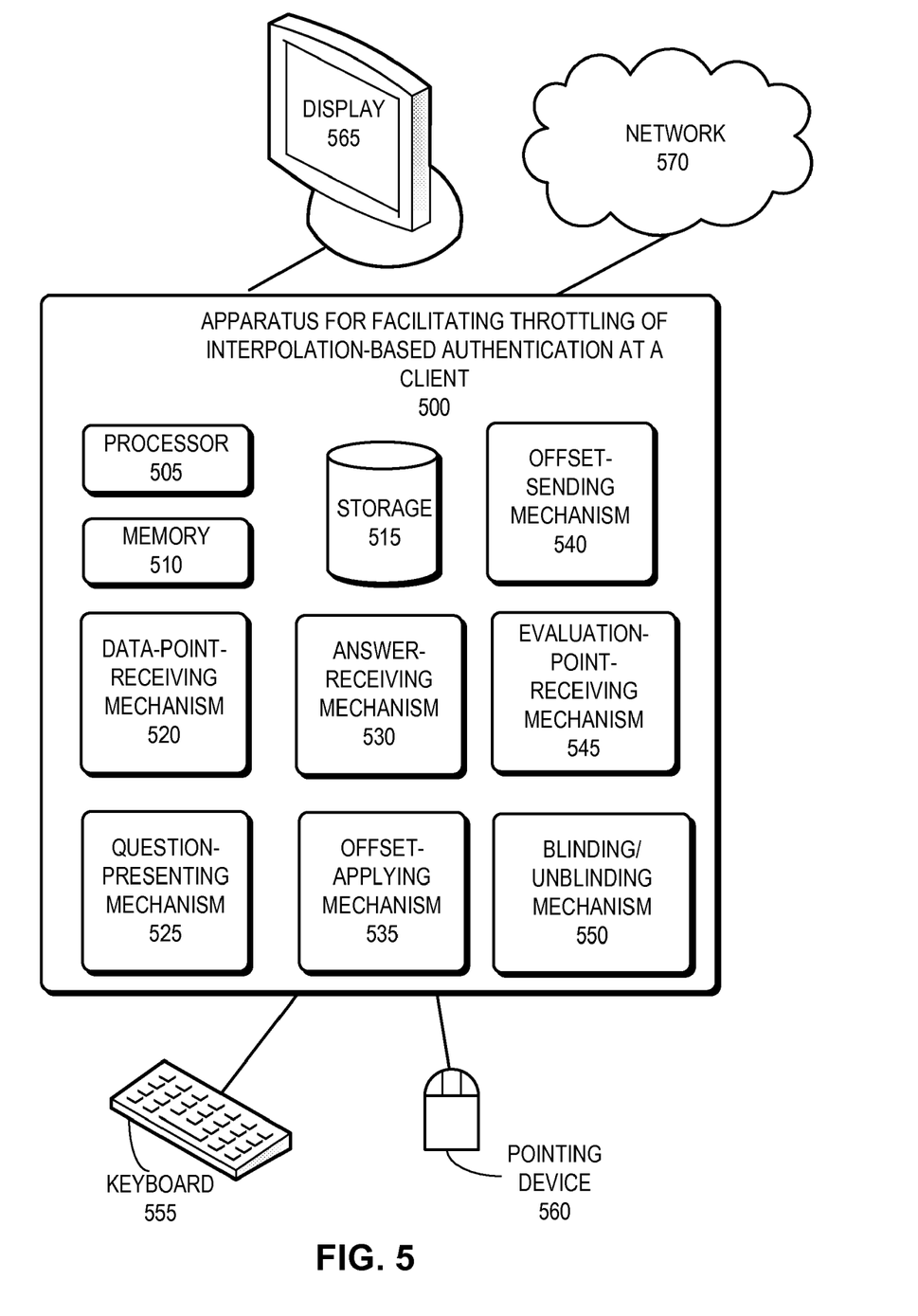
FIG. 5 presents an exemplary apparatus for facilitating throttling of interpolation-based authentication at a client in accordance with an embodiment.

FIG. 5 presents an exemplary apparatus for facilitating throttling of interpolation-based authentication at a client in accordance with an embodiment.

Apparatus 500 includes a processor 505, a memory 510, a storage 515, a data-point-receiving mechanism 420, a question-presenting mechanism 525, an answer-receiving mechanism 530, an offset-applying mechanism 535, an offset-sending mechanism 540, an evaluation-point-receiving mechanism 545, and a blinding/unblinding mechanism 550, all of which can be in communication with each other through various means.

In some embodiments, mechanisms 520-550 can be part of processor 505. Further, in some embodiments, the system may not include a separate processor and memory. Instead, in addition to performing their specific tasks, mechanisms 520-550, either separately or in concert, may be part of special- or general-purpose computation engines.

Storage 515 stores programs to be executed by processor 505. Specifically, storage 515 stores a program that implements a system (application) for facilitating throttling of interpolation-based authentication at a client. During operation, the application program can be loaded from storage 515 into memory 510 and executed by processor 505. As a result, apparatus 500 for facilitating throttling of interpolation-based authentication at a client can perform the functions described above. Apparatus 500 can be coupled to an optional display 565, keyboard 555, and pointing device 560. Apparatus 500 can also coupled to network 570, by which apparatus 500 can communicate with apparatus 600 for facilitating throttling of interpolation-based authentication at a throttle server.

Figure 6:
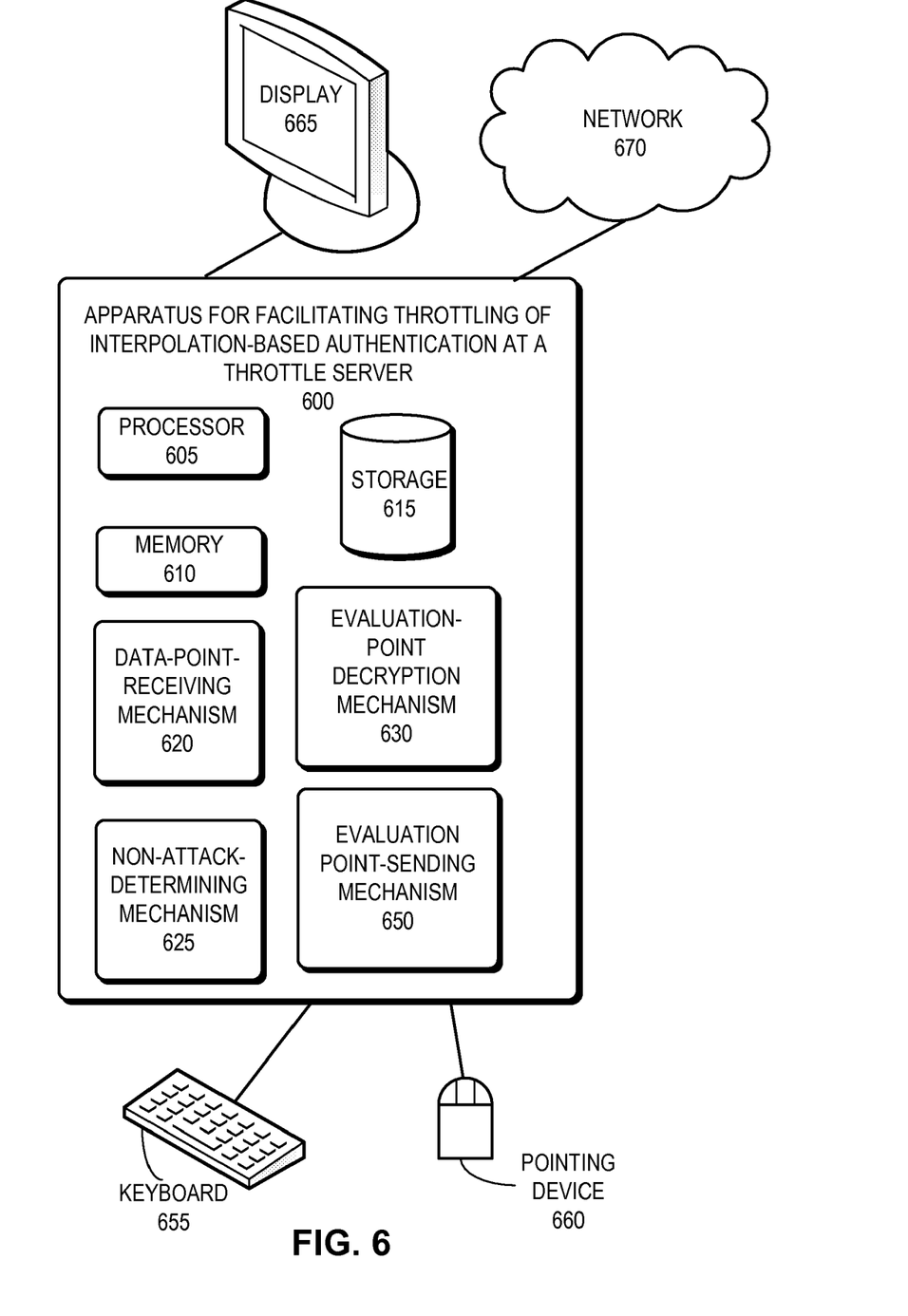
FIG. 6 presents an exemplary apparatus for facilitating throttling of interpolation-based authentication at a server in accordance with an embodiment.

FIG. 6 presents an exemplary apparatus for facilitating throttling of interpolation-based authentication at a throttle server in accordance with an embodiment. Apparatus 600 facilitates throttling of interpolation-based authentication at a throttle server. Apparatus 600 comprises a processor 605, a memory 610, storage 615, a data-point-receiving mechanism 620, a non-attack-determining mechanism 625, an evaluation-point decryption mechanism 630, an evaluation point-sending mechanism 650, all of which can be in communication with each other through various means.

In some embodiments, mechanisms 620-650 can be part of processor 605. Further, in some embodiments, the system may not include a separate processor and memory. Instead, in addition to performing their specific tasks, mechanisms 620-650, either separately or in concert, may be part of special- or general-purpose computation engines.

Storage 615 stores programs to be executed by processor 605. Specifically, storage 615 stores a program that implements a system (application) for facilitating throttling of interpolation-based authentication at a throttle server. During operation, the application program can be loaded from storage 615 into memory 610 and executed by processor 605. As a result, apparatus 600 for can perform the functions described above. Apparatus 600 can be coupled to an optional display 665, keyboard 655, and pointing device 660. Apparatus 600 can also be coupled to network 670, by which apparatus 600 can communicate with apparatus 500 for facilitating throttling of interpolation-based authentication at a client.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

The above description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

What is claimed is:

1. A computer-implemented method for facilitating throttling of interpolation-based authentication at a client, wherein the computer includes a processor, the method comprising:
   receiving data points encrypted with a public key associated with a throttle server;
   applying offsets to the data points, wherein a respective offset for a data point is associated with a user input;
   blinding the offset data points;
   sending to the throttle server the blinded offset data points, thereby allowing the throttle server to perform an interpolation on the blinded offset data points and maintain a count of interpolation attempts from the client;
   receiving from the throttle server an evaluation point based at least on the interpolation;
   unblinding the evaluation point; and
   using the unblinded evaluation point as a secret for a subsequent authentication process.

2. The method of claim 1, wherein the received data points are encrypted based on an ElGamal encryption scheme using the throttle server's public key; and
   wherein blinding the offset data points comprises raising each element of the corresponding ElGamal ciphertext to the exponent of a randomly selected value, r.

3. The method of claim 2, wherein unblinding the evaluation point comprises raising the evaluation point to the exponent of $1/r$.

4. The method of claim 1, further comprising presenting a number of challenge questions to a user, wherein a respective question corresponds to a respective data point.

5. The method of claim 4, further comprising:
   receiving answers from the user to the challenge questions; and
   determining a respective offset for a data point based on the user's answer to the challenge question corresponding to the data point.

6. A computer-implemented method for facilitating throttling of interpolation-based authentication at a throttle server, wherein the computer includes a processor, the method comprising:
   receiving from a client an interpolation request, wherein the interpolation request indicates a number of data points;
   performing an interpolation based at least on the blinded offset data points;
   computing an evaluation point based on the interpolation;
   maintaining a count of the number of interpolation requests from the client; and
   sending the evaluation point to the client.

7. The method of claim 6, further comprising:
   decrypting the received data points based on a private key associated with the throttle server prior to performing the interpolation; or
   decrypting the evaluation point subsequent to computing the evaluation point, wherein sending the evaluation point to the client comprises sending the decrypted evaluation point to the client.

8. The method of claim 7, wherein decrypting the data points or the evaluation point comprises applying an ElGamal decryption scheme using a private key associated with the throttle server.

9. The method of claim 6, further comprising determining whether the number of interpolation requests from the client exceeds a predetermined value.

10. The method of claim 6, wherein the received data points are previously encrypted based at least on a public key associated with the throttle server, and are previously offset and blinded by the client.

11. A computer system for facilitating throttling of interpolation-based authentication at a client, the computer system comprising:
    a receiving mechanism configured to receive data points encrypted with a public key associated with a throttle server;
    an offset mechanism configured to apply offsets to the data points, wherein a respective offset for a data point is associated with a user input;
    a blinding mechanism configured to blinding the offset data points;
    a communication mechanism configured to:
      send to the throttle server the blinded offset data points, thereby allowing the throttle server to perform an interpolation on the blinded offset data points and maintain a count of interpolation attempts from the client; and
      receive from the throttle server an evaluation point based at least on the interpolation;
    an unblinding mechanism configured to unblind the evaluation point; and
    an authentication mechanism configured to use the unblinded evaluation point as a secret for a subsequent authentication process.

12. The computer system of claim 11, wherein the received data points are encrypted based on an ElGamal encryption scheme using the throttle server's public key; and
    wherein while blinding the offset data points, the blinding mechanism is configured to raise each element of the corresponding ElGamal ciphertext to the exponent of a randomly selected value r.

13. The computer system of claim 12, wherein while unblinding the evaluation point, the unblinding mechanism is configured to raise the evaluation point to the exponent of $1/r$.

14. The computer system of claim 11, further comprising a presentation mechanism configured to present a number of challenge questions to a user, wherein a respective question corresponds to a respective data point.

15. The computer system of claim 14, wherein the presentation mechanism is further configured to:
    receive answers from the user to the challenge questions; and
    determine a respective offset for a data point based on the user's answer to the challenge question corresponding to the data point.

16. A computer-implemented computer system for facilitating throttling of interpolation-based authentication at a throttle server, the computer system comprising:
    a receiving mechanism configured to receive from a client an interpolation request, wherein the interpolation request indicates a number of data points;
    an interpolation mechanism configured to perform an interpolation based at least on the blinded offset data points;
    an computing mechanism configured to compute an evaluation point based on the interpolation;
    a counting mechanism configured to maintain a count of the number of interpolation requests from the client; and
    a communication mechanism configured to send the evaluation point to the client.

17. The computer system of claim 16, further comprising a decryption mechanism configured to:
- decrypt the received data points based on a private key associated with the throttle server prior to performing the interpolation; or
- decrypt the evaluation point subsequent to computing the evaluation point, wherein while sending the evaluation point to the client, the communication mechanism is configured to send the decrypted evaluation point to the client.

18. The computer system of claim 17, wherein while decrypting the data points or the evaluation point, the decryption mechanism is configured to apply an ElGamal decryption scheme using a private key associated with the throttle server.

19. The computer system of claim 16, further comprising a determination mechanism configured to determine whether the number of interpolation requests from the client exceeds a predetermined value.

20. The computer system of claim 16, wherein the received data points are previously encrypted based at least on a public key associated with the throttle server, and are previously offset and blinded by the client.

* * * * *